Feb. 2, 1926.
L. SCHOMBOURGER
1,571,738
COMPOUNDING ALTERNATING CURRENT MACHINE
Filed Sept. 24, 1924
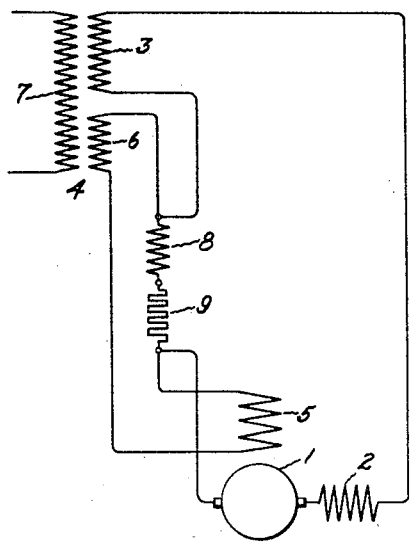
Inventor:
Lucien Schombourger,
by *Alexander S. Lentz*
His Attorney.

Patented Feb. 2, 1926.

1,571,738

UNITED STATES PATENT OFFICE.

LUCIEN SCHOMBOURGER, OF PARIS, FRANCE, ASSIGNOR TO GENERAL ELECTRIC COMPANY, A CORPORATION OF NEW YORK.

COMPOUNDING ALTERNATING-CURRENT MACHINE.

Application filed September 24, 1924. Serial No. 739,704.

*To all whom it may concern:*

Be it known that I, LUCIEN SCHOMBOURGER, a citizen of the French Republic, residing at Paris, France, have invented certain new and useful Improvements in Compounding Alternating-Current Machines, of which the following is a specification.

My invention relates to the compounding of alternating current machines, and has for its object the provision of an arrangement for eliminating or minimizing the difficulties which result from the inductive relation existing between the series and shunt exciting field windings in machines of this character.

In the compounding of alternating current commutator machines, difficulty is encountered because of the fact that the inductive relation existing between the shunt and series field windings prevents independent control of the shunt and series field currents. If the voltage applied to the shunt field winding is maintained constant, the flux produced through the shunt field winding will tend to assume a steady value and this condition will obtain so long as the machine load does not vary. Upon a change in the machine load, however, the series field current changes and, due to this change, there is induced in the shunt field winding a voltage which greatly complicates the problem of compounding the machine in a definite manner. In accordance with my invention, the difficulty is avoided by the provision of means for rendering the shunt and series field fluxes substantially independent of one another.

My invention will be better understood from the following description when considered in connection with the accompanying drawing, in which the single figure is a diagrammatic showing thereof, and its scope will be pointed out in the appended claims.

The drawing shows an alternating current commutator machine which comprises an armature winding 1 and a compensating field winding 2 arranged to be connected in series to the secondary winding 3 of a transformer 4, and which also comprises an exciting field winding 5 arranged to be connected to the secondary winding 6 of the transformer 4. The transformer 4 is provided with a primary winding 7. Reactor 8 and resistor 9, which form a section common to the exciting and armature circuits of the machine, are provided for the purpose of compounding the machine.

Assuming the connections to be as illustrated, and the transformer 4 to be energized, the voltage impressed on the field winding 5 will comprise a series component and a shunt component. The shunt component is produced by the transformer secondary winding 6. The series component is produced by the impedance drop occasioned by transmission of the machine load current through an impedance means consisting of reactor 8 and the resistor 9. In order for the compounding to be definite for different values of frequency, it is necessary that the relation between the reactance of the reactor 8 and the resistance of the resistor 9 be the same as the relation between the reactance and resistance of the winding 5. This is true for the reason that otherwise changes in the frequency of the exciting current would alter the phase relation of the two voltage components and change the degree of the compounding. Assuming the magnetic circuits of the machine to be slightly saturated, it is thus possible to produce through a single field winding the excitation required to create the proper degree of compounding and to maintain this degree of compounding regardless of changes in the frequency of the machine current. While this method of compounding has been described as applied to a single phase machine, it will be readily understood that it is also applicable to polyphase machines, but that when so applied it is subject to the limitation that the points of contact between the armature and exciting circuits must be so chosen as to avoid the production of circulating currents.

I have explained my invention by illustrating and describing a specific embodiment thereof, but it will be readily understood by those skilled in the art that the arrangement of this embodiment may be modified in certain of its details. I, accordingly, do not wish to be restricted to the particular arrangement disclosed herein by way of example for the purpose of setting forth my invention in accordance with the patent statutes. The terms of the appended claims are, therefore, not restricted to the precise arrangement disclosed, but are intended to cover all changes within the true spirit and scope of my invention.

What I claim as new and desire to secure by Letters Patent of the United States is:—

1. An alternating current commutator machine comprising a field winding and an armature circuit, means for impressing a shunt component voltage on said field winding, and means connected in said armature circuit exterior of said motor for impressing on said field winding a component voltage which is proportional in value to the load current of said machine.

2. An alternating current machine having shunt and series circuits for producing shunt and series component field fluxes, a resistor, and a reactor connected in series with said resistor to form a section common to said shunt and series circuits whereby the compounding of said machine may be rendered definite for different values of the machine load current and independent of the frequency at which said current is supplied.

3. An altenating current commutator machine comprising a field winding, means for applying a shunt component voltage to said field winding, and means including a resistor and a reactor for applying to said field winding a component voltage which is proportional to the load current of said machine.

4. An alternating current machine comprising a single exciting field winding, means for applying a shunt component voltage to said field winding, impedance means connected in series with such winding and having a resistance and reactance bearing the same relation to one another as that existing between the resistance and reactance of said winding, and means for producing through said impedance means a component voltage which is proportional to the load current of said machine.

In witness whereof, I have hereunto set my hand this 5th day of September, 1924.

LUCIEN SCHOMBOURGER.